UNITED STATES PATENT OFFICE.

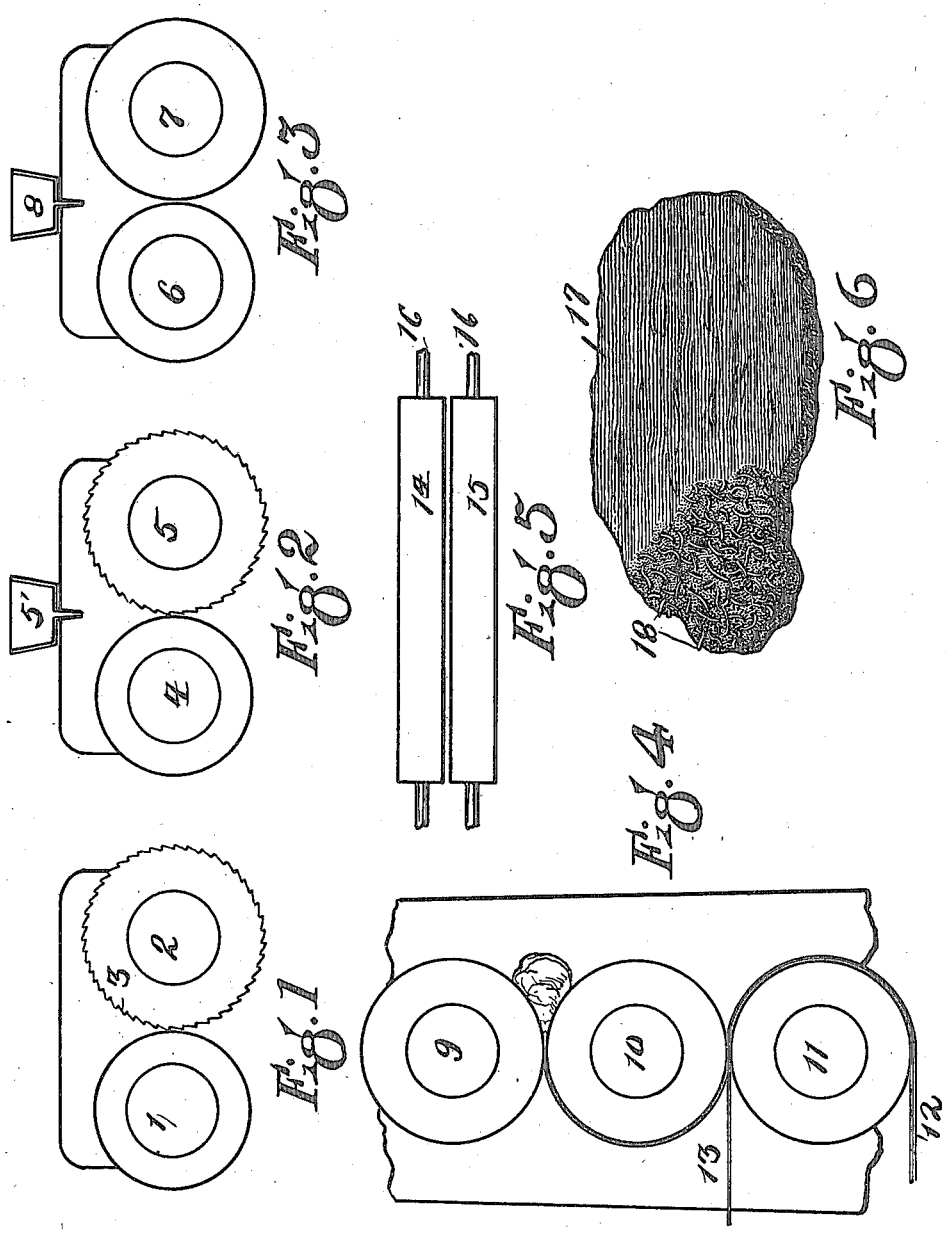

FRANK T. LAHEY, OF AKRON, OHIO.

PROCESS OF MAKING FIBROUS MATERIAL.

1,233,252.     Specification of Letters Patent.     Patented July 10, 1917.

Application filed January 14, 1916. Serial No. 72,129.

*To all whom it may concern:*

Be it known that I, FRANK T. LAHEY, a citizen of the United States, residing at Akron, in the county of Summit and State of Ohio, have invented new and useful Improvements in Processes of Making Fibrous Material, of which the following is a specification.

This invention relates to improvements in processes for producing sheeted, waterproof material from a vulcanizable or partially vulcanizable compound embodying fibrous material and capable of being used for the manufacture of boxes, containers, roofing, etc.

The object of the invention is to provide an improved process by which a material may be produced from various ingredients, afterward capable of being vulcanized into a hard and partially rigid sheeted condition and containing substantially long fibers to strengthen the material made therefrom and increase its wearing ability, over sheeted material wherein fibers are ground up or so comminuted as to render them short and less effective as a binding element.

My invention contemplates the utilization of such relatively cheap material as scrap rubber hose, belting, tires, etc., which contains a large percentage of fibrous matter which, under ordinary circumstances, is removed if the rubber contained in the article is to be devulcanized, to thereby avoid the expense of removing the fibrous material and at the same time, render the product more effective for the purpose for which the same is intended.

In carrying out the process I employ certain mechanical instrumentalities all of which are well known and are shown in the accompanying drawing, wherein similar reference numerals indicate like parts in the different figures.

In the drawings,

Figure 1, is a diagrammatic view of an ordinary mill for grinding up rubber;

Fig. 2, is a view similar to Fig. 1 of a similar mill used for grinding rubberized fabric or fabric containing vulcanized rubber;

Fig. 3, is a diagrammatic view of a mixing mill employed;

Fig. 4, is a diagrammatic view of a calender for sheeting material;

Fig. 5, is a view of a vulcanizing press for compressing and vulcanizing the product; and, Fig. 6, is a perspective view showing the product in so far as the limitations of a drawing will show the same.

My process consists in subjecting ordinary vulcanized rubber or rubber compound commonly called vulcanized rubber to the action of a mill such, for instance, as is shown in Fig. 1 wherein are two rolls 1 and 2 the peripheries of which are adapted to coöperate during the grinding operation, the roll 1 having a less peripheral speed than the peripheral speed of the roll 2 and the latter provided with corrugated or toothed face 3. These are mounted in the ordinary housing and are revolved by the ordinary means, but as the ordinary mill for grinding is well known to the art, a further description is believed to be unnecessary.

The next step consists in grinding up fibrous material such as wood fibers or vulcanized rubber articles containing fiber such as hose, belting, boots, shoes, tires, etc., in the mill shown in the drawing in Fig. 2 comprising a pair of rolls 4 and 5 operating in an identically similar manner as the rolls 1 and 2 in Fig. 1. Positioned above the meeting point of the peripheries of the rolls 4 and 5 is a tank in which is placed some oleaginous material which is fed to the working portions of the rolls during the grinding operation and the function of which is to impregnate or lubricate the fibers so that they will not be unduly shortened or comminuted but will remain of a substantial length so that when incorporated in the ultimate product they increase the strength of the same due to the anchorage they secure in the same and also due to their inherent strength, experience having thoroughly demonstrated that when the fibers are ground in a mill such as shown in Fig. 2 without the addition of a lubricant or some oleaginous substance, the fibers are unduly comminuted and the product is inefficient for the purpose for which it is intended. The lubricant employed may be anyone suited for the purpose; it may consist, for instance, of an oil obtained from asphalt, mineral pitch, and chiefly composed of hydrocarbon, the substance known as ozokerite, vaseline, paraffin or the residual oils from vacuum distillates of paraffin. Any of the foregoing may be employed as lubricants and others can be used with equal effect and still come within the scope of the present invention.

After the vulcanized rubber has been ground up in the mill shown in Fig. 1 and the fibrous material ground up in the mill shown in Fig. 2 the pulverized or comminuted substances are mixed together in the mixing mill shown in Fig. 3 which constitutes a pair of rolls 6 and 7 the peripheral speed of the latter being greater than the roll 6 and provided with a tank 8 in which may be placed any substance which it is desired to mix with the mass during the intermingling of the comminuted fiber and the comminuted rubber. It is sometimes desirable to include in the mass some filler such as fossil flour, magnesia, magnesite, fuller's earth, zinc oxid, or other similar substance which will constitute a filler for the purpose intended. It is also preferable that a proper amount of sulfur be incorporated in the mass during the mixing thereof so that when the product is subjected to heat and pressure the product may be vulcanized into a mass intimately uniting the rubber, filler, oils, and fibers or strands, into a firm, tough, partially elastic and water-proof substance. After the mixing the mass is subjected to the action of a common calender comprising three rolls 9, 10 and 11 in the usual way and the product 12 is carried out from the calender on a strip of muslin or other fabric 13 in the usual manner. The mass leaving the calender in sheeted form is then placed in a press comprising an upper member 14 and lower member 15 to one or both of which steam is admitted through inlet pipes 16, and after being exposed to heat and pressure between the members 14 and 15, the product assumes a condition somewhat resembling the structure shown in Fig. 6 wherein the reference numeral 17 designates the product. This product is usually of a dark color with a smooth upper and lower face, is tough, water-proof and partially rigid, yet capable of being bent to a limited extent with little elasticity, of dense texture and with all portions united together by the fibrous strands 18 incorporated therein. It may be pointed out that these strands are of substantial length often extending from one-half inch to one and one-half inches and even greater length.

Experience has demonstrated that if an oleaginous substance is not fed to the mill during the grinding up of the fibrous material, the fibers are unduly comminuted and their efficiency in the finished product is thereby greatly reduced and the strength of the subsequent product is consequently less than it would be where the strands are properly lubricated and consequently less disintegrated and reduced to extremely short lengths.

It is entirely within the scope of this invention that instead of separately grinding up the vulcanized rubber in one mill and the fibrous material in another mill, such substance as hose, belting, tires, etc., containing a large percentage of both vulcanized rubber and fibrous material may be ground up at a single operation in a mill such as is shown either in Fig. 1 or Fig. 2 and afterward the filler and vulcanizing agent incorporated by a subsequent mixing, if desired; and furthermore, the incorporation of a filler such as has already been described together with the vulcanizing agent may be intermingled and mixed in the mass during the initial grinding in the first mill which serves to reduce the rubber to a comminuted condition and disintegrate to a great extent the fibrous portions of the mass.

I claim:

1. The process consisting in disintegrating rubberized fabric in the presence of an oleaginous substance.

2. The process consisting in disintegrating rubberized fabric, and simultaneously feeding an oleaginous substance thereto.

3. A step in the process of manufacturing a partially flexible water-proof material which consists in disintegrating a fibrous rubber material while intimately intermixed with an oleaginous substance which prevents undue comminution of the filaments thereof.

4. A process of manufacturing a partially flexible water-proof material which consists in disintegrating a vulcanized rubber containing fibrous material in the intimate presence of an oleaginous substance which prevents undue comminution of the filaments thereof, adding a substance having the characteristics of a vulcanizing agent and subjecting the mixture to heat and pressure.

5. A process of manufacturing a partially flexible water-proof sheeted member which consists in disintegrating rubber scrap containing fibrous material, adding an oleaginous substance to the mass during the disintegrating operation which prevents undue comminution of the filaments of the fibrous material, adding sulfur and heating and pressing the product.

In testimony whereof I have hereunto set my hand.

FRANK T. LAHEY.